United States Patent
Bouguerra et al.

(10) Patent No.: US 12,549,504 B2
(45) Date of Patent: Feb. 10, 2026

(54) ENHANCED SCHEDULING OPERATIONS UTILIZING LARGE LANGUAGE MODELS AND METHODS OF USE THEREOF

(71) Applicant: YAHOO ASSETS LLC, New York, NY (US)

(72) Inventors: Bassem Bouguerra, Long Beach, CA (US); Kevin Patel, Fremont, CA (US); Shashank Khanna, Fremont, CA (US); Shiv Shankar Sahadevan, San Jose, CA (US)

(73) Assignee: YAHOO ASSETS LLC, New York, NY (US)

( * ) Notice: Subject to any disclaimer, the term of this patent is extended or adjusted under 35 U.S.C. 154(b) by 217 days.

(21) Appl. No.: 18/476,401

(22) Filed: Sep. 28, 2023

(65) Prior Publication Data

US 2024/0354711 A1     Oct. 24, 2024

Related U.S. Application Data

(60) Provisional application No. 63/497,944, filed on Apr. 24, 2023.

(51) Int. Cl.
| | |
|---|---|
| G06F 40/00 | (2020.01) |
| G06F 16/00 | (2019.01) |
| G06F 16/34 | (2019.01) |
| G06F 40/166 | (2020.01) |
| G06F 40/20 | (2020.01) |
| G06F 40/205 | (2020.01) |
| G06F 40/30 | (2020.01) |
| G06F 40/40 | (2020.01) |
| G06Q 10/00 | (2023.01) |
| G06Q 10/1093 | (2023.01) |
| H04L 51/00 | (2022.01) |

(Continued)

(52) U.S. Cl.
CPC ......... *H04L 51/214* (2022.05); *G06F 16/345* (2019.01); *G06F 40/166* (2020.01); *G06F 40/20* (2020.01); *G06F 40/205* (2020.01); *G06F 40/30* (2020.01); *G06F 40/40* (2020.01); *G06Q 10/1093* (2013.01); *H04L 51/02* (2013.01); *H04L 51/04* (2013.01); *H04L 51/046* (2013.01); *H04L 51/216* (2022.05); *H04L 51/42* (2022.05); *H04W 4/02* (2013.01)

(58) Field of Classification Search
CPC .......................................... G06Q 10/00–50/00
USPC ...................................................... 705/7.19
See application file for complete search history.

(56) References Cited

U.S. PATENT DOCUMENTS

| | | | |
|---|---|---|---|
| 2009/0006161 A1* | 1/2009 | Chen .................. | G06Q 10/1095 705/7.19 |
| 2010/0235446 A1* | 9/2010 | Hehmeyer .......... | G06Q 10/109 707/E17.014 |

(Continued)

*Primary Examiner* — Mustafa Iqbal
(74) *Attorney, Agent, or Firm* — James J. DeCarlo; Greenberg Traurig, LLP

(57) ABSTRACT

Disclosed are systems and methods for receiving a meeting request via an electronic account of a user; determining a conflict between the meeting request and a pre-existing meeting, extracting and comparing information associated with each meeting based on an analysis of each meeting; determining a priority associated with each meeting based on the analysis of the information of each meeting; and utilizing a machine learning model to generate an output associated with the priority of each meeting to the electronic account of the user.

18 Claims, 4 Drawing Sheets

(51) Int. Cl.
*H04L 51/02* (2022.01)
*H04L 51/04* (2022.01)
*H04L 51/046* (2022.01)
*H04L 51/214* (2022.01)
*H04L 51/216* (2022.01)
*H04L 51/42* (2022.01)
*H04W 4/00* (2018.01)
*H04W 4/02* (2018.01)

(56) References Cited

U.S. PATENT DOCUMENTS

| | | | |
|---|---|---|---|
| 2013/0218622 A1* | 8/2013 | MacKenzie | G06Q 10/1093 |
| | | | 705/7.19 |
| 2020/0334641 A1* | 10/2020 | Singh | G06N 20/00 |
| 2021/0117058 A1* | 4/2021 | Qian | H04M 1/72451 |
| 2023/0147297 A1* | 5/2023 | Ban | G06Q 10/109 |
| | | | 705/7.19 |
| 2024/0144192 A1* | 5/2024 | Weissenberger | G06F 3/0482 |

\* cited by examiner

ENHANCED SCHEDULING OPERATIONS UTILIZING LARGE LANGUAGE MODELS AND METHODS OF USE THEREOF

CROSS-REFERENCE TO RELATED APPLICATIONS

This application claims the benefit of Provisional Patent Application No. 63/497,944, filed on Apr. 24, 2023, which is hereby incorporated by reference in its entirety.

BACKGROUND

Current scheduling applications generally utilize a calendar interface for representing scheduled events (e.g., meetings, appointments, and/or reservations) as well as modifying existing events. Thus, most scheduling applications are limited in functionality and require human labor due to basic display systems used to implement the applications.

BRIEF DESCRIPTION OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
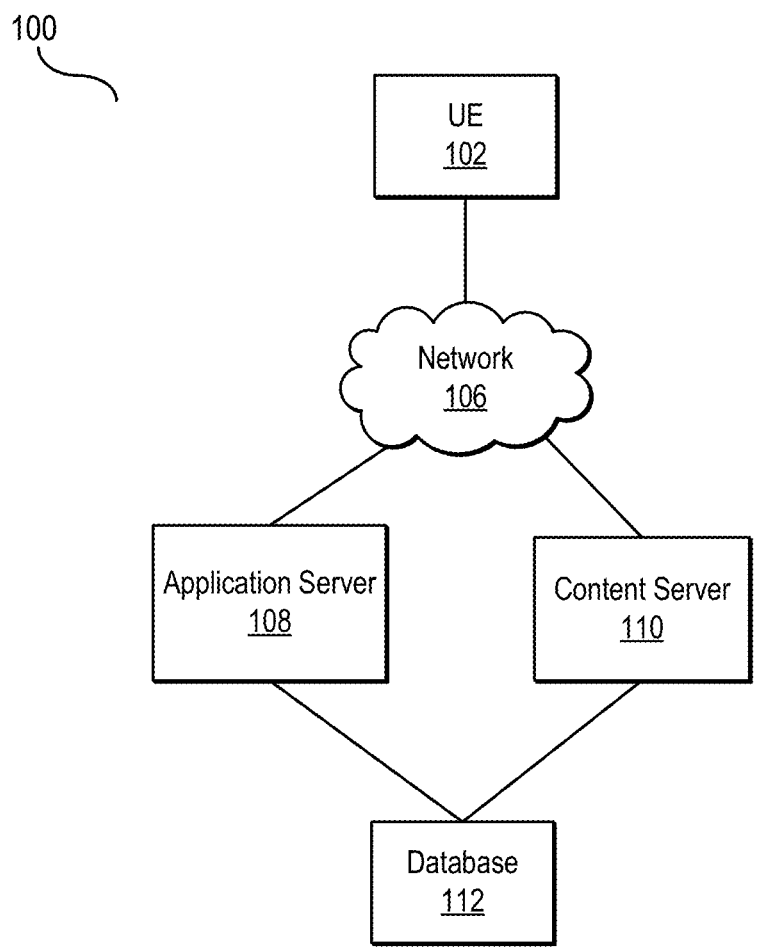
FIG. 1 is a block diagram of an example network architecture according to some embodiments of the present disclosure.

Conventional scheduling systems are limited in their ability to organize a plurality of meetings within a calendar display. To that end, according to some embodiments, the present disclosure addresses such shortcomings, among other features, and provides a system and method for providing a dynamic recommendation to prevent and resolve a scheduling conflict. According to some embodiments, as discussed herein, the dynamic recommendation can include, but is not limited to, a prioritization of multiple meetings scheduled at the same time.

Scheduling applications and/or digital inbox applications allow users to organize a plurality of meetings within a mail application. These applications allow users to add, delete, modify, and reschedule any of these meetings within the application. However, these actions of the user typically require manual labor of the part of the user. Such an approach places a burden on the user and fails to intelligently make recommendations based on the user's schedule and preferences. These meetings may be electronic meetings (e.g., ZOOM® meetings) or real-world meetings or events (e.g., doctor's appointments, wedding invitations, or dinner reservations). Some systems can alert a user when a conflict occurs between two scheduled meetings, but these systems still require the user manually add, delete, modify, and/or reschedule at least one meeting to rectify the conflict. That is, no automated operations are provided beyond mere alerting.

For example, a scheduling application of a device may identify a conflict based on two meetings being scheduled for the same time (or overlapping times), and the user is notified of this conflict via a transmission (e.g., email, push notification, or a visual indication within the application). Thus, the user is alerted of the conflict but must manually determine a next step after receiving the notification. As such, scheduling applications fall short of providing a dynamic recommendation to the user that prioritizes one meeting over the other in such a conflict.

Accordingly, as discussed herein, the disclosed systems and methods provide a framework that enables the generation and output of a recommendation to the user, whereby the recommendation is based on the analysis of meeting requests using a machine learning model, such as a large language model (LLM), and therefore, dynamically determines a priority of meetings within a conflict based on user identity and behavior. As provided below, this can enable automatic acceptance of meetings requests, generation of requests to reschedule, generation of a decline message to a meeting request, and the like.

It should be understood that while the discussion herein will focus on an email within an inbox of a user, it should not be construed as limited to email, as other types of known or to be known electronic messages (e.g., SMS, MMS, chat, social media messages) can form the basis for the executed functionality discussed herein without departing from the scope of the disclosed systems and methods.

FIG. 1 is a block diagram of an example network architecture according to some embodiments of the present disclosure.

As shown in FIG. 1, a network 106 may communicatively couple a user equipment ("UE") 102 to an application server 108 and a content server 110. According to some embodiments, UE 102 can be any type of device that is capable of displaying an inbox of a messaging account, such as a personal computer ("PC"), laptop, desktop, personal digital assistant ("PDA"), smart television, smart device (e.g., smart phone, smart tablet or smart television), and so forth. In some embodiments, a scheduling application may operate on application server 108 communicatively coupled to the content server 110 and a database 112. In some embodiments, the illustrative scheduling application can be implemented as a scheduling engine (see FIG. 2) described further herein. In some embodiments, the scheduling engine may operate in a virtual computing system in the network 106. In some embodiments, the scheduling application may operate entirely, or partially (via a client-server architecture), on a user device such as UE 102. In some embodiments, the application server 108 may perform a plurality of actions associated with the scheduling application. In some embodiments, the content server 110 may store any static content associated with the scheduling application. In some embodiments, the database server 112 may store a plurality of prompts and/or messages associated with the scheduling application. In some embodiments, as discussed herein, the scheduling application may be configured to operate on any similar computing device or similar endpoint, or any combination thereof.

In certain embodiments, the illustrative scheduling application may optionally provide and/or display a calendar on the UE 102 via a graphical user interface ("GUI"), where the GUI may contain multiple programmable elements. The calendar display (i.e., a mail application) on the UE 102 may communicate with the illustrative scheduling application and the mail application.

Figure 2:
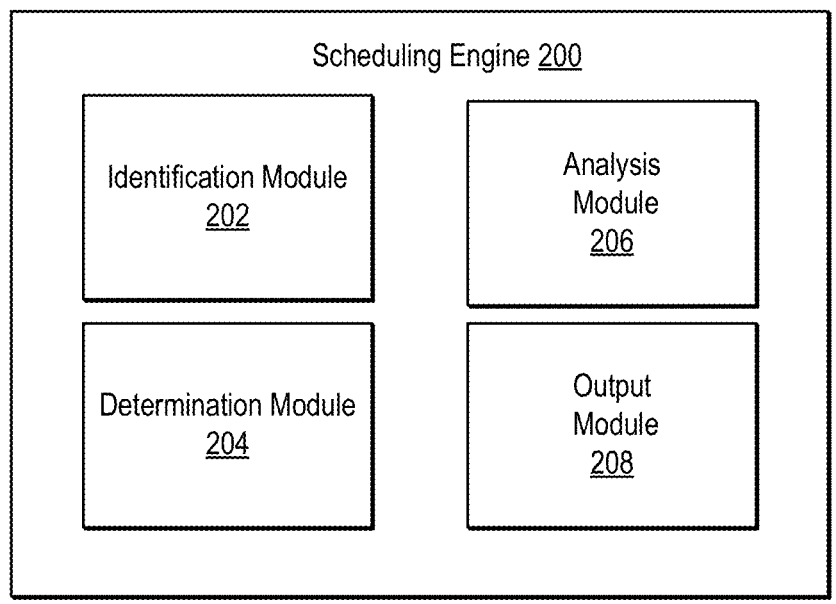
FIG. 2 is a block diagram illustrating components of a scheduling engine according to some embodiments of the present disclosure.

As depicted in FIG. 2, the illustrative scheduling application may utilize a scheduling engine 200, where the scheduling engine 200 can include, but is not limited to, an identification module 202, an analysis module 204, a determination module 206, and the output module 208. The operational capabilities and implemented of each module 202 through module 208, and engine 200 as a whole, are discussed in more detail at least in relation to FIG. 3.

It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

The scheduling engine 200 can overcome a scheduling conflict between multiple meeting requests by providing a generated recommendation to prioritize multiple meetings based on use of a large language model ("LLM"). An LLM can be trained on large amounts of text data from various sources, learning the statistical relationship between words, phrases, and sentences. Once trained, the LLM is capable of generating content to display to a user in the form of an output text, (e.g., generated recommendation) responsive to an input prompt, as discussed herein.

According to some embodiments, the LLM can be configured to first tokenize text input into a sequence of subwords or characters, where the tokens can then be encoded as vector representations of the tokens (known as embeddings) such as by the identification module 202. The LLM, using a transformer architecture, processes these embeddings across multiple layers of self-attention and feed-forward neural networks to create a contextualized representation for each token. The representation of each token depends not just on the token itself but also on all other tokens in the input. The LLM can then estimate the probability distribution for the next token in the sequence given the preceding tokens and select the token with the highest probability (or sample from the distribution, depending on the exact setup). This is done in an autoregressive manner, where the model generates one token at a time. In some embodiments, the scheduling engine 200 is not limited to utilizing a transformer-based large language model but can also deploy a diverse array of machine learning models. This may include models specifically fine-tuned for certain domains, models applying bidirectional encoder representations from transformers (BERT), multimodal models capable of handling multiple types of input, and models using different kinds of vector representations. Furthermore, the system might leverage zero-shot learning capabilities, enabling it to make predictions on tasks without having seen specific examples of that task during training.

In some embodiments, the scheduling engine 200 (which can embody the mail application) can be configured to operate on the application server 108 or content server 110 or part of a virtual computing system on the network 106 communicatively coupled to database 112 and can be configured with one or more module(s) for determining a conflict between a meeting request and a pre-existing meeting and an LLM for refining how a user interacts with content in an inbox. In some embodiments, the scheduling engine 200 can be configured with one or more module(s) each module can be configured as a computing device having one or more processors, a RAM/ROM, a memory system, a communication bus, a communication interface, specific hardware computing components that can be included in each module have been described in detail in FIG. 2. In some embodiments, the module(s) can be communicatively coupled to a messaging service, each module can include, among other applications, a messaging application. In alternative embodiments, the LLM used by scheduling engine 200 may alternatively be implemented on the client-side (e.g., on UE 102).

In some embodiments, the scheduling engine 200 can be configured with an identification module 202 for determining vector representations. The identification module 202 can be configured to determine numerical representations of the data items associated with the email inbox of a user. The vector representations of the data items can be utilized by one or more AI and/or machine learning ML model(s) to determine information related to meeting request and pre-existing meetings.

In some embodiments, the scheduling engine 200 can be configured with an analysis module 204 for analyzing information associated with the meeting request and the pre-existing meeting. In some embodiments, the analysis module 204 can be configured with one or more AI and/or ML model(s) to determine priority of the meetings and determine a prompt to display to the user. In some embodiments, the analysis module 204 can also be configured with one or more applications for generating a recommendation based on historical trends of the user and/or explicit preferences of the user as described below.

In some embodiments, the engine 200 can be configured with a determination module 206 for determining a priority of each meeting. In some embodiments, the determination module 206 can be configured with one or more AI and/or ML model(s) to determine priority and determine a prompt to display to a user. In some embodiments, the determination module 206 can also be configured with one or more applications for determining whether a conflict is present between the meeting request and the pre-existing meeting as described below.

In some embodiments, the engine 200 can be configured with an output module 208 for generating a recommendation associated with the determined priority of each meeting. In some embodiments, the output module 208 can be configured with the LLM application to determine the priority of the meeting request and the pre-existing meeting and generate a prompt (i.e., chatbot) to communicate with a user. In some embodiments, the output module 208 can also be configured with one or more applications for providing a response to a meeting request as described below.

In some embodiments, each of the one or more AI and/or ML model(s) LLM model of the analysis module 204, the determination module 206, and the output module 208 can be independently trained models. In some embodiments, the determination module 206 can be configured to utilize a LLM to determine a priority of each meeting. In some embodiments, the LLM of the determination module 206 can be independently trained to generate a prompt, (e.g., recommendation) of determined priority depending on a user preference. In some embodiments, the analysis module 204 can be configured to utilize an independently trained LLM to determine a priority of each meeting. In some embodiments, the LLM of the analysis module 204 can be independently trained a generate a result of contextual and extracted information related to each meeting received in the inbox of the user depending on a user preference. In some embodiments, the LLM of the analysis module 204 can be trained to determine user relevant information in a meeting request in a complete sentence format. In some embodiments, user relevant information can be context time-sensitive based information that requires a user response, for example an appointment invitation. In some embodiments, the output module 208 can be configured with an independently trained LLM, trained to generate a prompt based on the determined priority, depending on a user preference. In some embodiments, the prompt message LLM can be trained to determine in simple bullet point, information from a received message.

In some embodiments, the engine 200 user interface can be configured with an LLM prompt for displaying a determined prompt and receiving user interactions such as on a user device UE 102. In some embodiments, the engine 200 can be configured to transmit the LLM prompt over a network to a centralized LLM via an application programming interface (API) or similar endpoint. In some embodiments, the LLM can be executing locally on the device executing the messaging client.

Figure 3:
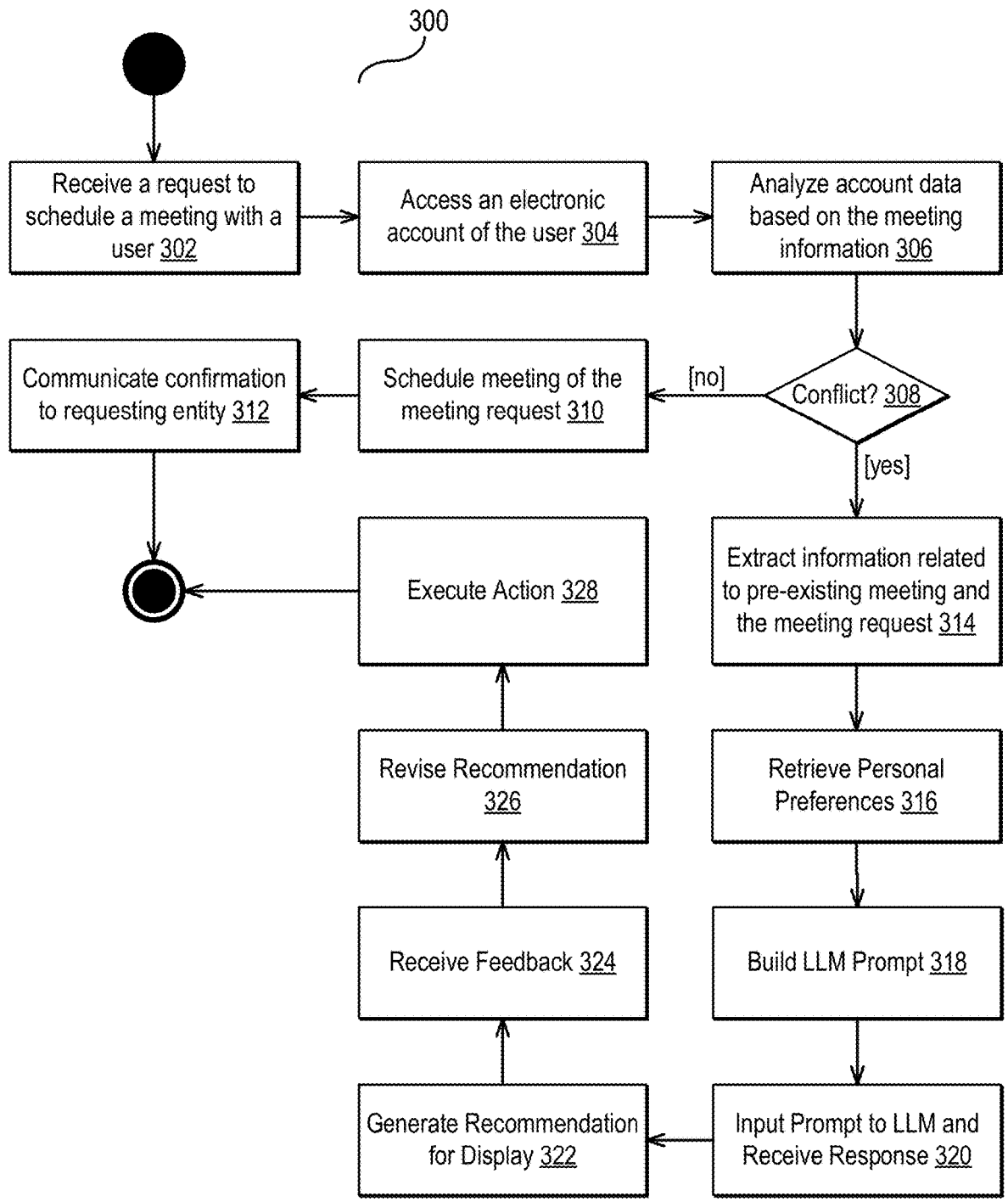
FIG. 3 is a flow diagram illustrating a method for performing a determination of priority of at least two meetings within an application according to some embodiments of the present disclosure.

FIG. 3 is a flow diagram illustrating a method for performing a determination of priority of at least two meetings within an application according to some embodiments of the present disclosure.

In step 302, the method 300 can include receiving a request to schedule a meeting with a user. The meeting can be an electronic meeting or a real-world meeting, as previously discussed. The request may include particular information associated with the meeting. For example, the meeting request can include a date, time, participation identification, documents, materials, assets, requirements to join, directions, etc. Alternatively, or in conjunction with the foregoing, step 302 can be executed periodically by analyzing a user's calendar to determine if any conflicting events are present. In certain embodiments, the method 300 can be implemented by the scheduling engine 200.

In step 304, the method 300 can include accessing an electronic account of the user. The electronic account may be associated with a mail and/or scheduling account of a user. In certain embodiments, the electronic account may be linked to a calendar application, social media accounts, etc. For example, the method 300 may identify a meeting request within an inbox of the user, where the inbox can be a mail inbox, a social media direct message, a text message, or a transcription of a phone call on the UE 102.

In step 306, the method 300 can include analyzing data associated with the account based on the meeting request information. In some embodiments, the analysis can be performed via any type of known or to be known functionality related to the identification of meeting requests for purposes of identifying a conflict between at least two meeting requests. For example, the method 300 can determine a time period associated with the meeting request received in step 302 (e.g., 10-11 AM), query the content server 110 of the scheduling engine 200 using the time period as a filter, and determine if there are any overlapping events for that time period. As such, after step 306 the method 300 obtains a proposed meeting (from step 302) and zero or more conflicting meetings (from step 306) which may partially or wholly conflict with the proposed meeting.

In step 308, the method 300 can include determining whether a conflict is present between a pre-existing meeting and the meeting request. The conflict may refer to an overlap of a time period of a pre-existing meeting or a competing meeting request (from step 306) and the meeting request received in step 302. A competing meeting request may refer to a meeting request with an overlapping time period of another meeting request. In some embodiments, the method 300 can utilize a conflict detector to determine whether the conflict exists. The conflict detector can be run automatically or on demand. The conflict detector looks at time periods and any events that are within the time period of the meeting request. In certain embodiments, the conflict may refer to a partial overlap of any amount of time. In the event of the analysis of the accounts fail to determine that a conflict is present, the method 300 can schedule the meeting in step 310. The scheduling of the meeting can update calendar data associated with the user for subsequent display in the calendar application. The update of the account information can dynamically add the meeting information for display on the UE 102. In step 312, the method 300 can communicate a confirmation to an entity that transmitted the meeting request in step 302. The confirmation of the scheduling of the meeting request can be a notification detailing the information of the meeting request. The entity can refer to a user, an application, a server, a platform and the like.

While step 310 and step 312 illustrate a standard acceptance of a meeting barring a conflict. In some implementations, the following process can be modified and executed on a proposed meeting that does not include a conflict. For example, as will be explained in more detail, the user receiving the proposed meeting may have a preference to not conduct work meetings after 5 PM. Such a preference effectively represents a "conflict" although it is not a scheduled event. Thus, in some implementations, user preferences can be reformatted as ephemeral scheduled events that exist only for executing the method. For example, a preference to only conduct work meetings between 9 AM and 5 PM can be represented as a virtual or ephemeral meeting scheduled for 5 PM to 9 AM that is personal in nature. As such, if a proposed meeting (regardless of its content) is scheduled for 6 PM, a virtual conflict can be synthesized and detected, after which step 314 may be executed. Thus, the disclosure is not limited to purely scheduled events and such virtual events may also be analyzed.

In the event that, the method 300 determines a conflict is present in step 308 (either scheduled or virtual), in step 314, the method 300 can include extracting additional information related to the pre-existing meeting from step 306 and the proposed meeting request from step 302.

In some implementations, this additional information can refer to a type of meeting (i.e., professional, medical, and/or social, etc.), a duration of meeting, a location of meeting, number of participants, content to be discussed, identification of a host, and the like, and other details associated with the pre-existing meeting and the received meeting request. In some embodiments, the method 300 can build a representation of each meeting in response to extracting the additional information related to each meeting. In some implementations, the method can include inputting the additional information into an LLM and prompting the LLM to provide further additional information about the meeting. For example, a meeting may not have a designated category (professional, medical, etc.) but its title or topic ("Dentist appointment" or "Discuss contact") may imply a category. In such a scenario, the method 300 can input this information into an LLM with a prompt requesting additional context. For example, a prompt such as "Given a meeting request entitled, 'Dentist Appointment,' please provide a high-level category for such a request" or "Please categorize a meeting entitled 'Dentist Appointment' as either 'personal' or 'work'" can be used to synthesize the additional information from a potentially limited set of additional data. In this manner, a full set of additional data for the events can be generated. In some implementations, other NLP approaches besides LLMs may be used (e.g., sentiment analysis, BERT or other language representation models, etc.).

In step 316, the method 300 can include retrieving the personal preferences of the user. In some embodiments, the personal preferences may refer to contextual information related to the preferences of the user and/or historical trends associated with the user. In some implementations, these personal preferences can include information such as a prioritization of certain calendars over others, a preference for certain topics, a preference on scheduling times (e.g., morning vs. evening), etc. In some implementations, these preferences can manually set by the user or may be inferred by analyzing historical interactions of the user and/or calendar actions of the user. In some implementations, these personal preferences can be stored directly in the electronic account of a user. In other implementations, the personal preferences can be analyzed based on communications of the user (e.g., built up over time).

In step 318, the method 300 can include building a prompt using the information related to the meetings as well as the user's personal preferences. In some implementations, the prompt may comprise a text template that is populated with meeting data and, if available, preference data. For example, the following prompt may be used:

Given the following proposed meeting:
<proposed meeting details>
And the following conflicting meetings
<conflicting meeting 1 details>
< . . . >
<conflicting meeting n details>
And my personal preferences <preferences>. Please recommend how to resolve the conflicting proposed meeting.

Here, "proposed meeting details" and "conflicting meeting n details" can comprise a formatted representation of the underlying meeting data and additional data retrieved in the previous steps. For example, "Contract review, 5-6 PM Sep. 8, 2023." Certainly, more detail can be input into these template placeholders. Similarly, the "preferences" placeholder can comprise a listing of the user's personal preferences such as "no work after 5 PM, prioritize family events," etc. The foregoing prompt is exemplary only and other forms of such a prompt (including a specific output format instruction) can be included.

In step 320, the method 300 can include inputting the prompt into an LLM and receiving a recommendation in response. In some implementations, the LLM may output a response in the form of a recommended course of action. The output of the LLM application may be a serialized response such as a JavaScript Object Notion (JSON) object processible by a scheduling application. This serialized response may refer to an array, where each array element is an object having keys (i.e., ID, narrative information, and duration) for any prompts and/or recommendations. For example, the JSON response may provide details on how to reschedule one or more of the meetings processed in step 314. The following is an example of one type of JSON response:

{"recommendations": [
  {"action": "cancel", "target": "proposed meeting"},
  {"action": "move", "target": "proposed meeting",
  "date": "2023-09-15", "time": "1400"}
]}

In step 322, the method 300 can generate a text-based recommendation for the user providing information related to the recommended re-scheduling. In some implementations, this text-based recommendation can also be generated by the LLM (using the JSON object as an input) or may be generated alongside the JSON representation. In some implementations, the method 300 can transmit the text-based recommendation to a UI of the scheduling application. In some implementations, the UI can include a chat window that the allows the user to converse with the scheduling engine 200 via the LLM application.

As an example of the foregoing steps, the method 300 may identify six meetings within a three-day time period, identify an explicit user preference that places a higher weight on personal obligations over work obligations, receive a meeting request that conflicts with a pre-existing meeting, and generates a recommended modification to the scheduling application to accommodate the meeting request, where the modification is output as a JSON array. In certain embodiments, the method 300 may transmit the generated recommendation to the user via a chat interface. In certain embodiments, the generated recommendation may be narrative text detailing modifications to the scheduling engine 200 to accommodate the meeting request.

In step 324, method 300 can include receiving feedback from user in response to the generated recommendation. The feedback may refer to a conversation (back and forth process) between the user and the scheduling engine 200 to optimize the determination of priority of the meetings. In certain embodiments, the feedback may be utilized for subsequent meeting requests as additional data points for the historical trends associated with the user as described above. In some embodiments, the method 300 may display the determined priority on the UE 102 via a GUI accompanying the generated recommendation associated with the priority of the meetings, where the GUI allows the user to provide the feedback to the generated prompt.

In step 326, the method 300 can include revising the recommendation. In some embodiments, the method 300 can revise the recommendation based on the feedback from the user. The revision may be a single step revision, or a multi-step revision, where the back-and-forth process between the user and the engine 200 causes a plurality of changes to the recommendation. These changes may be based on the historical trends of the user and/or the explicit preferences. In some implementations, the method 300 can receive a text-based command ("please don't reschedule the proposed meeting") and can input the prompt generated in step 318 which the next user feedback. Thus, in this scenario, the method 300 can return to step 318 to build a prompt that also include the feedback received in step 324. In some implementations, this process can be repeated zero or more times depending on the accuracy of the LLM output and the user-provided feedback in step 314.

In step 328, the method 300 can include executing an action. In some implementations, the action can include revising a user's calendar based on the recommendation. In some implementations, step 328 can be triggered by a user selecting a UI element (e.g., button) that causes the scheduling application to execute the action. In some implementations, the action can be generated based on the JSON output of the LLM (e.g., which defines a meeting identifier and proposed new day or time). In some implementations, the action can include updating a calendar. In other implementations, the action can include transmitting a proposed new meeting time to the second of a meeting request. As discussed, the action may be repeatedly updated based on user feedback in step 322 before a user executes the action. Certainly, in some implementations, the action can be executed immediately after receiving the LLM output if the user has no changes to the proposed recommendation.

Figure 4:
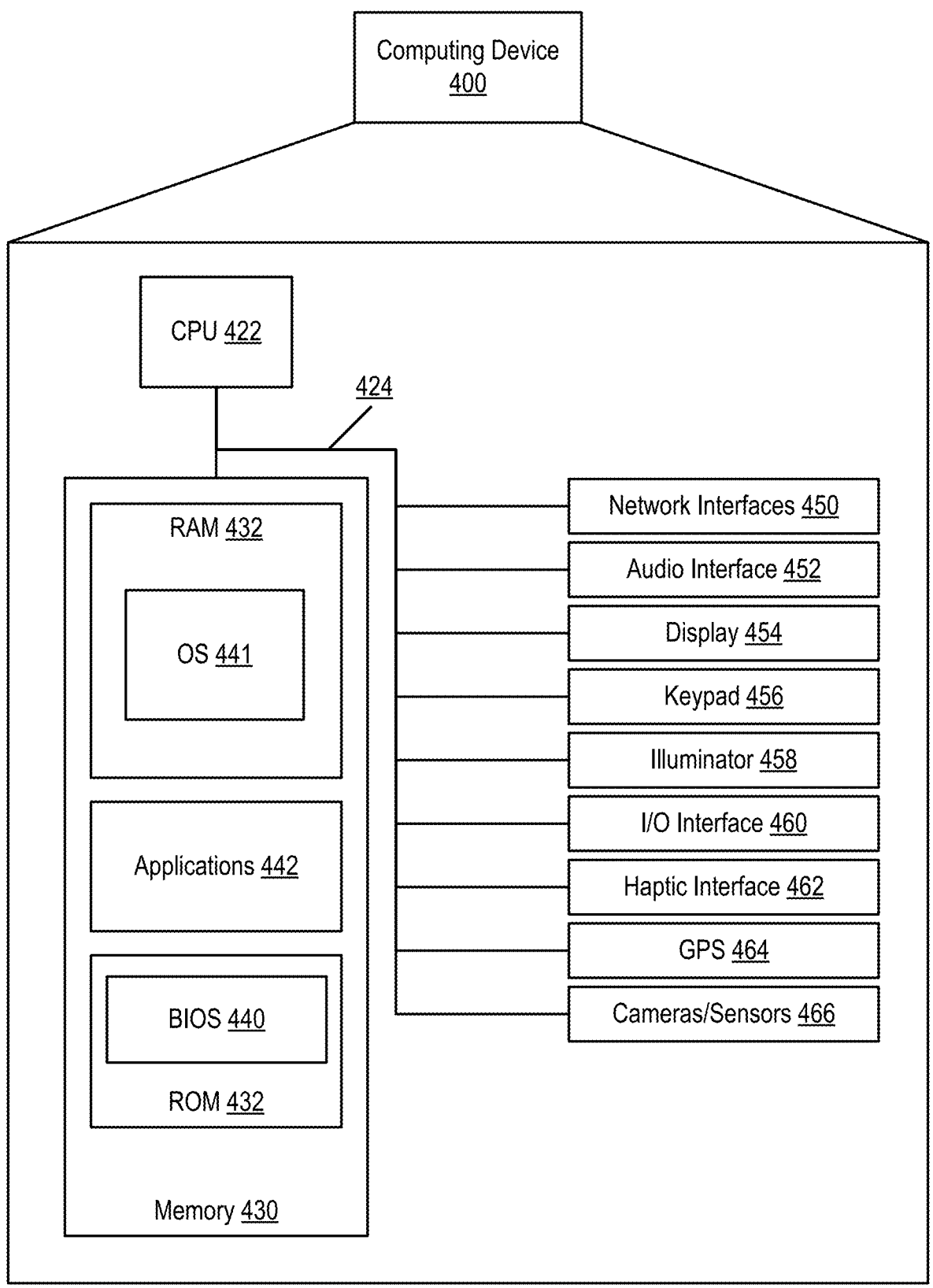
FIG. 4 depicts an exemplary implementation of an architecture according to some embodiments of the present disclosure.

FIG. 4 is a block diagram illustrating a computing device showing an example of a client or server device used in the various embodiments of the disclosure.

The computing device 400 may include more or fewer components than those shown in FIG. 4, depending on the deployment or usage of the device 400. For example, a server computing device, such as a rack-mounted server, may not include audio interfaces 452, displays 454, keypads 456, illuminators 458, haptic interfaces 462, GPS receivers 464, or cameras/sensors 466. Some devices may include additional components not shown, such as graphics processing unit (GPU) devices, cryptographic co-processors, artificial intelligence (AI) accelerators, or other peripheral devices.

As shown in FIG. 4, the device 400 includes a central processing unit (CPU) 422 in communication with a mass memory 430 via a bus 424. The computing device 400 also includes one or more network interfaces 450, an audio interface 452, a display 454, a keypad 456, an illuminator 458, an input/output interface 460, a haptic interface 462, an optional global positioning systems (GPS) receiver 464 and a camera(s) or other optical, thermal, or electromagnetic sensors 466. Device 400 can include one camera/sensor 466 or a plurality of cameras/sensors 466. The positioning of the camera(s)/sensor(s) 466 on the device 400 can change per device 400 model, per device 400 capabilities, and the like, or some combination thereof.

In some embodiments, the CPU 422 may comprise a general-purpose CPU. The CPU 422 may comprise a single-core or multiple-core CPU. The CPU 422 may comprise a system-on-a-chip (SoC) or a similar embedded system. In some embodiments, a GPU may be used in place of, or in combination with, a CPU 422. Mass memory 430 may comprise a dynamic random-access memory (DRAM) device, a static random-access memory device (SRAM), or a Flash (e.g., NAND Flash) memory device. In some embodiments, mass memory 430 may comprise a combination of such memory types. In one embodiment, the bus 424 may comprise a Peripheral Component Interconnect Express (PCIe) bus. In some embodiments, the bus 424 may comprise multiple busses instead of a single bus.

Mass memory 430 illustrates another example of computer storage media for the storage of information such as computer-readable instructions, data structures, program modules, or other data. Mass memory 430 stores a basic input/output system ("BIOS") 440 for controlling the low-level operation of the computing device 400. The mass memory also stores an operating system 441 for controlling the operation of the computing device 400.

Applications 442 may include computer-executable instructions which, when executed by the computing device 400, perform any of the methods (or portions of the methods) described previously in the description of the preceding Figures. In some embodiments, the software or programs implementing the method embodiments can be read from a hard disk drive (not illustrated) and temporarily stored in RAM 432 by CPU 422. CPU 422 may then read the software or data from RAM 432, process them, and store them to RAM 432 again.

The computing device 400 may optionally communicate with a base station (not shown) or directly with another computing device. Network interface 450 is sometimes known as a transceiver, transceiving device, or network interface card (NIC).

The audio interface 452 produces and receives audio signals such as the sound of a human voice. For example, the audio interface 452 may be coupled to a speaker and microphone (not shown) to enable telecommunication with others or generate an audio acknowledgment for some action. Display 454 may be a liquid crystal display (LCD), gas plasma, light-emitting diode (LED), or any other type of display used with a computing device. Display 454 may also include a touch-sensitive screen arranged to receive input from an object such as a stylus or a digit from a human hand.

Keypad 456 may comprise any input device arranged to receive input from a user. Illuminator 458 may provide a status indication or provide light.

The computing device 400 also comprises an input/output interface 460 for communicating with external devices, using communication technologies, such as USB, infrared, Bluetooth™, or the like. The haptic interface 462 provides tactile feedback to a user of the client device.

The optional GPS transceiver 464 can determine the physical coordinates of the computing device 400 on the surface of the Earth, which typically outputs a location as latitude and longitude values. GPS transceiver 464 can also employ other geo-positioning mechanisms, including, but not limited to, triangulation, assisted GPS (AGPS), E-OTD, CI, SAI, ETA, BSS, or the like, to further determine the physical location of the computing device 400 on the surface of the Earth. In one embodiment, however, the computing device 400 may communicate through other components, providing other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, by a processor, a meeting request via an electronic account of a user;
   determining, by the processor, a conflict between the meeting request and a pre-existing meeting;
   building, by the processor, a prompt, the prompt including representations of the meeting request, the pre-existing meeting, and at least one user preference;

inputting, by the processor, the prompt into a machine learning model, an output of the machine learning model comprising a proposed modification of an item selected from the group consisting of the meeting request and the pre-existing meeting;

generating, by the processor, a recommendation based on the output of the machine learning model and presenting the recommendation to the user;

generating, by the processor, a response to the meeting request using the output of the machine learning model;

receiving user feedback responsive to the recommendation;

generating a second prompt that includes the prompt and the user feedback; and inputting the second prompt into the machine learning model to obtain a revised recommendation.

2. The method of claim 1, wherein the machine learning model comprises a large language model.

3. The method of claim 1, wherein building the prompt comprises inputting the representations of the meeting request and the pre-existing meeting into a prompt template.

4. The method of claim 1, wherein the at least one user preference comprises a preference selected from the group consisting of an explicit user preference and an inferred user preference.

5. The method of claim 1, wherein a representation of a given meeting includes one or more of a type, a duration, a location, a number of participants, content to be discussed, and identification of a host.

6. The method of claim 1, wherein an output of the machine learning model comprises a serialized format and the method further comprises executing an action based on the serialized format.

7. A non-transitory computer readable storage medium for tangibly storing computer program instructions capable of being executed by a computer processor, the computer program instructions defining the steps of:

receiving, by a processor, a meeting request via an electronic account of a user;

determining, by the processor, a conflict between the meeting request and a pre-existing meeting;

building, by the processor, a prompt, the prompt including representations of the meeting request, the pre-existing meeting, and at least one user preference;

inputting, by the processor, the prompt into a machine learning model, an output of the machine learning model comprising a proposed modification an item selected from the group consisting of the meeting request and the pre-existing meeting;

generating, by the processor, a recommendation based on the output of the machine learning model and presenting the recommendation to the user;

generating, by the processor, a response to the meeting request using the output of the machine learning model;

receiving, by the processor, user feedback responsive to the recommendation;

generating, by the processor, a second prompt that includes the prompt and the user feedback; and inputting, by the processor, the second prompt into the machine learning model to obtain a revised recommendation.

8. The non-transitory computer readable storage medium of claim 7, wherein the machine learning model comprises a large language model.

9. The non-transitory computer readable storage medium of claim 7, wherein building the prompt comprises inputting the representations of the meeting request and the pre-existing meeting into a prompt template.

10. The non-transitory computer readable storage medium of claim 7, wherein the at least one user preference comprises a preference selected from the group consisting of an explicit user preference and an inferred user preference.

11. The non-transitory computer readable storage medium of claim 7, wherein a representation of a given meeting includes one or more of a type, a duration, a location, a number of participants, content to be discussed, and identification of a host.

12. The non-transitory computer readable storage medium of claim 7, wherein an output of the machine learning model comprises a serialized format and the steps further comprise executing an action based on the serialized format.

13. A device comprising:
a processor configured to:
receive a meeting request via an electronic account of a user;
determine a conflict between the meeting request and a pre-existing meeting;
build a prompt, the prompt including representations of the meeting request, the pre-existing meeting, and at least one user preference;
input the prompt into a machine learning model, an output of the machine learning model comprising a proposed modification of an item selected from the group consisting of the meeting request and the pre-existing meeting;
generate a recommendation based on the output of the machine learning model and presenting the recommendation to the user;
generate a response to the meeting request using the output of the machine learning model;
receive user feedback responsive to the recommendation;
generate a second prompt that includes the prompt and the user feedback; and
input the second prompt into the machine learning model to obtain a revised recommendation.

14. The device of claim 13, wherein the machine learning model comprises a large language model.

15. The device of claim 13, wherein building the prompt comprises inputting the representations of the meeting request and the pre-existing meeting into a prompt template.

16. The device of claim 13, wherein the at least one user preference comprises a preference selected from the group consisting of an explicit user preference and an inferred user preference.

17. The device of claim 13, wherein a representation of a given meeting includes one or more of a type, a duration, a location, a number of participants, content to be discussed, and identification of a host.

18. The device of claim 13, wherein an output of the machine learning model comprises a serialized format and the processor further configured for executing an action based on the serialized format.

* * * * *